United States Patent [19]

Wright et al.

[11] 4,032,444
[45] June 28, 1977

[54] GRAVITATIONAL SEPARATOR FOR MIXTURES OF IMMISCIBLE LIQUIDS OF DIFFERENT DENSITIES

[75] Inventors: David A. Wright; Chester H. Walters, both of St. Louis, Mo.

[73] Assignee: National Marine Service, Inc., St. Louis, Mo.

[22] Filed: Aug. 29, 1975

[21] Appl. No.: 608,905

[52] U.S. Cl. .................... 210/86; 73/309; 210/104; 210/115; 210/123; 210/295
[51] Int. Cl.² ........................... B01D 17/02
[58] Field of Search ............. 73/290 R, 309, 404; 210/83, 86, 91, 94, 104, 105, 115, 123, 242 R, 295, 538, 540

[56] References Cited

UNITED STATES PATENTS

| | | | |
|---|---|---|---|
| 1,698,002 | 1/1929 | Pink | 210/123 X |
| 1,908,691 | 5/1933 | Coe | 210/115 X |
| 1,940,762 | 12/1933 | Madhone | 210/123 X |
| 2,074,959 | 3/1937 | Guest | 73/290 R |
| 2,282,538 | 5/1942 | Yarnall | 73/309 |
| 2,872,935 | 2/1959 | Kenney | 210/104 |
| 2,947,437 | 8/1960 | Greer | 61/46 |
| 3,167,694 | 1/1965 | Bekedam | 73/290 R |
| 3,234,792 | 2/1966 | Ririe et al. | 73/309 X |
| 3,425,556 | 2/1969 | Völker | 210/104 |
| 3,628,660 | 12/1971 | In't Veld | 210/104 |
| 3,957,638 | 5/1976 | In't Veld | 210/104 |

FOREIGN PATENTS OR APPLICATIONS

| | | | |
|---|---|---|---|
| 96,580 | 1/1961 | Netherlands | 210/115 |
| 1,212,553 | 11/1970 | United Kingdom | 210/104 |

Primary Examiner—Frank A. Spear, Jr.
Assistant Examiner—R. G. Mukai
Attorney, Agent, or Firm—Bacon & Thomas

[57] ABSTRACT

An improved gravitational separator for mixtures of immiscible liquids of different densities, particularly oil and water, includes a reaction member in the form of a dome or diaphragm immersed in more dense liquid to be separated and which floats upwardly in the more dense liquid under the influence of liquid of less density accumulated beneath the dome or diaphragm, and a precise, passive balance means for the reaction member used to sense the accumulation of a predetermined volume of less dense liquid in the separator. The balance means is a system of weight masses contained entirely in the separator that are raised by the upward movement of the reaction member under the influence of accumulated less dense fluid, in combination with remote sensing means outside the separator for sensing the respective balance conditions and signalling appropriate system controls to cause suspension of the influx of mixture into the separator and discharge therefrom of accumulated lighter liquid. A coalescer screen filter system is provided in the water outlet path in the separator, the coalescer screens being contained in a chamber provided with automatically operating check valves to ensure proper flow of water in a forward and back-flush sense through the chamber. The reaction member may be provided with flexible seal means extending vertically in the separator for preventing the accumulation of lighter liquid above the reaction member, while not interfering with the operation of the balancing system of the reaction member.

11 Claims, 4 Drawing Figures

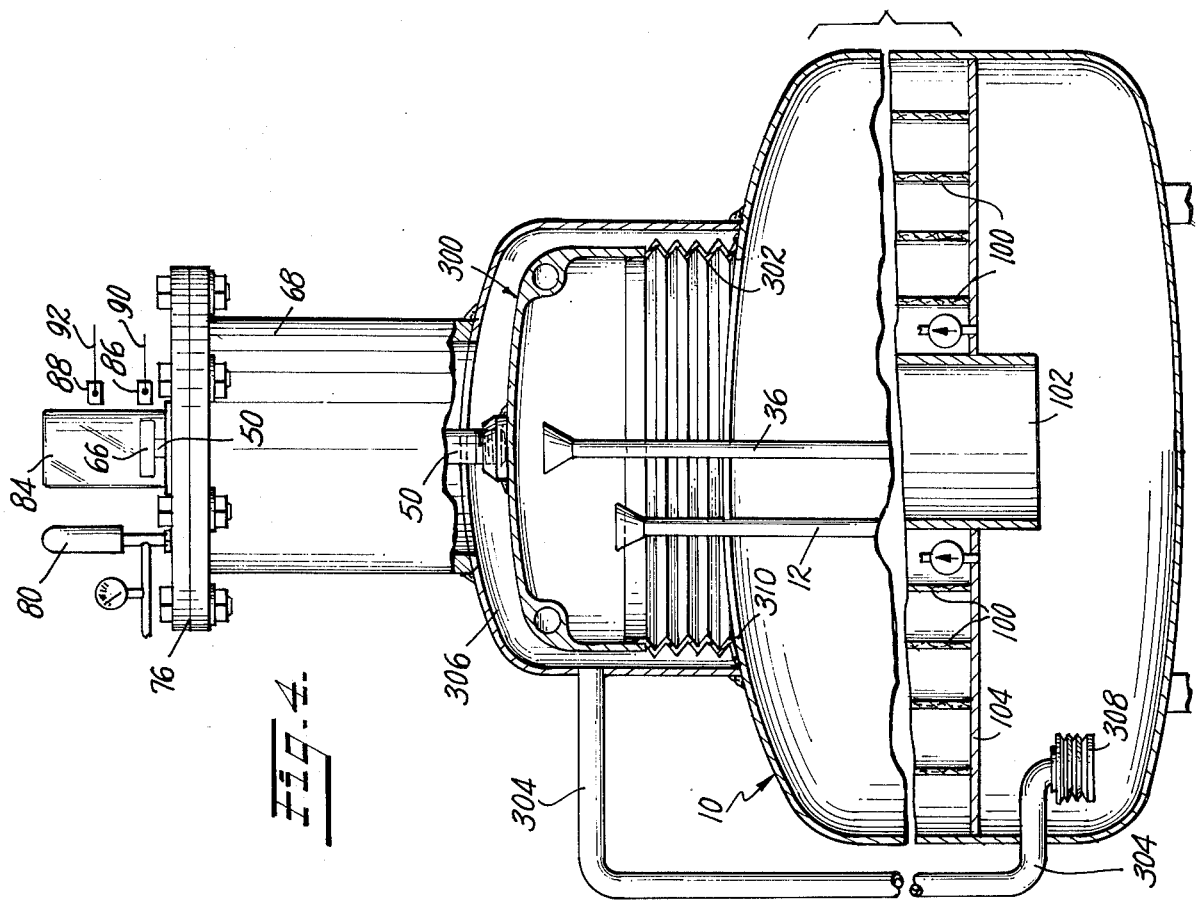
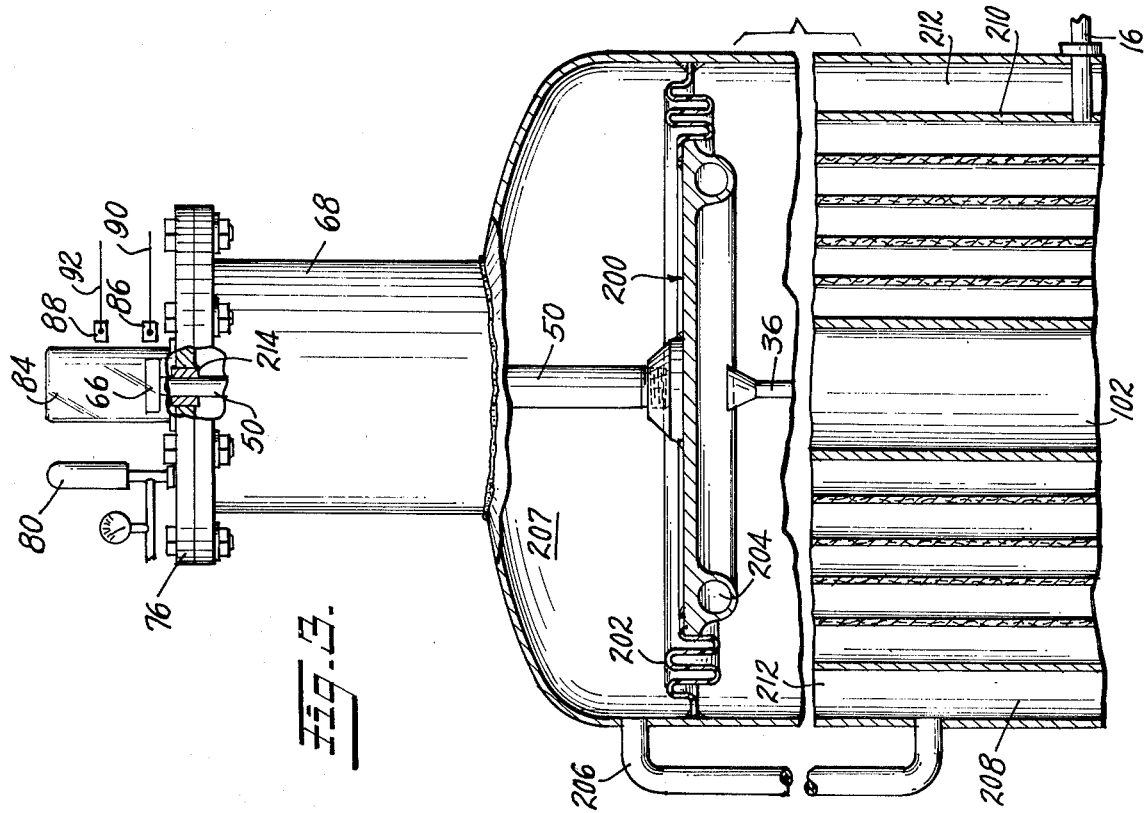

GRAVITATIONAL SEPARATOR FOR MIXTURES OF IMMISCIBLE LIQUIDS OF DIFFERENT DENSITIES

BACKGROUND OF THE INVENTION

The present invention relates to an improved form of gravity separator for mixtures of immiscible liquids of different densities, such as, for example, oil and water.

More specifically, the invention is an improved gravitational separator of the type utilizing a collection tank or housing for receiving a mixture of the fluids to be gravitationally separated, the tank having either a floating dome or diaphragm element within the upper area of the tank which serves as a reaction surface against which the volume of lighter (less dense) fluid accumulated within the upper portion of the tank exerts an upward, buoyant influence.

Separators of the type utilizing a floating dome are known in the prior art, as exemplified in the British patent specification No. 1,212,553 to Cornelis in'tVeld published Nov. 18, 1970 and U.S. Pat. No. 3,628,660, also to in'tVeld, granted Dec. 21, 1971. In separators of this type, the mixture of lighter and heavier fluids (oil and water, generally) is admitted to the interior of the separator beneath the dome under positive pressure or is inducted therein by suction of the heavier fluid from the heavier fluid discharge pipe of the separator, with the separator being hermetically sealed. The mixture of heavier and lighter fluids gravitationally separate in the separator, with lighter fluid rising up under the dome and heavier fluid sinking to the lower part of the separator vessel beneath the dome.

The gradual accumulation of lighter fluid beneath the dome, which is counterbalanced so as to normally be slightly negatively buoyant in the heavier fluid, causes the dome to float upwardly in the heavier fluid within the separator. It is customary to sense the high limit position of the dome to produce a control signal useful to instigate valve and pump actuations which enable the removal of less dense separated fluid from beneath the dome.

Gravitational separators of this type that are used to separate oil from an oily water mixture are provided with filter or coalescer screens or elements between the lower part of the separator and the water discharge pipe to collect any lingering droplets of oil carried to the lower part of the separator. Such screens are backwashed periodically to remove the oil clinging to the coalescers and, as described in the above-referenced U.S. Pat. No. 3,628,660, such backwashing of the screens can be carried out quite efficiently during the oil discharge mode of separator operation. That is, it is customary procedure to remove the accumulated oil from beneath the floating dome by pressurizing the clean water discharge pipe of the separator to admit clean water backwards into the lower end of the separator through the coalescer screens, and into the area beneath the dome to thereby force accumulated oil out of the separator under positive pressure. Only oil is discharged, of course, the reverse inflow of water being ceased when the accumulated oil has been discharged and the dome has sunk to its lower starting level.

Several problem areas have been encountered with the use of separators of the type just described. There has arisen, for example, a need for a simple, efficient and substantially failsafe system to precisely counterbalance the floating dome or the diaphragm beneath which the separated oil is trapped and to accurately sense when the volume of separated oil has reached an upper limit within the separator so that removal procedures can be instigated. Particularly in instances where the specific gravity of the oil to be separated is close to the density of water, a need for an extremely precise means for measuring a predetermined volume of accumulated oil is necessary to ensure proper functioning of the separator. Also, flow of water through the coalescer screens has been found to be less than ideal both in a forward and reverse flush sense. Ideally, flow in a forward direction through the coalescer screens should be uniform across all of the screens in the system and when the screens are backflushed, the backflush flow should occur entirely across the surfaces of the coalescer screens to remove oil droplets therefrom and furthermore, the discharge of oil from between the coalescer screens should be as complete as possible during the backflush operation. Finally, it has been found to be highly desirable to prevent any accumulation of oil above the separator dome (or diaphragm) during the operating life of the separator, since accumulation of the less dense fluid above the dome causes an inaccurate flotation response of the dome to the accumulated oil beneath the dome.

One approach to the dome counterbalance problem has been described in U.S. Pat. No. 3,957,638 assigned to the assignee of the instant application. In this patent, which is incorporated herein by reference, a complete description is provided of a prior art dome balancing system and separator control system which the present invention is intended to improve upon. It should be noted that, although not illustrated in that patent, the prior art balancing and control system was pneumatically operated. The complex balancing system of levers, weights, pivoted shafts, bearings and seals was found to be cumbersome and heavy as well as costly to fabricate. Moreover, an electronic control system has been found to be far more desirable than the electrical system illustrated in that patent and the pneumatic system previously in use.

The present invention finds particular application in a bilge water disposal system for a vessel, such as described in copending U.S. application Ser. No. 530,539 filed Dec. 9, 1974 by the inventors Chester H. Walters (one of the present co-inventors), Harold J. Barmeier, Jr. and Greig Sullivan, that application having been assigned also to the assignee of the present invention, and which is intended to be incorporated herein by reference. Other applications of the present invention, of course, are envisioned in static, industrial installations for separating mixtures of immiscible fluids of different densities.

SUMMARY OF THE INVENTION

The present invention contemplates a simplified, dependable means for adjustably balancing the floating dome or the floating diaphragm means used to sense the accumulation of lighter fluid in a specific type of gravity separator. The improved balance system in effect enables the precise sensing of a predetermined volume or weight of lighter fluid within the separator and the generation of a control signal in response to the sensed condition for controlling flow valves and a pump to thereby regulate the operation of the separator. The separator has specific application for removing oil from oily water mixtures and will be hereinafter referred to in this context, although the invention is broadly contemplated as having utility in connection with the separation of any fluids of different densities.

In general, the floating element in the separator is connected directly to a first adjustable mass or weight for balancing the floatable element within predetermined lower limits of flotation and is arranged to directly engage a second mass or weight when the floating element reaches a higher level of flotation. The system of weights enables the floating element of the separator to be free to continuously float in the separator within upper and lower limits, while the degree of buoyancy of the floatable element is varied between flotation limits.

The entire balance system is located within the separator housing and magnetic responsive switches or the like located outside the housing respond to the position of a permanent magnetic element attached to the dome or diaphragm within the housing and which is intended to transmit the movement of the dome or diaphragm through the magnetic switches. The entire interior of the separator tank therefore can remain hermetically sealed while an external signal can be derived of the dome or diaphragm position at upper and lower limits to sense the presence of a predetermined accumulation of oil beneath the dome or diaphragm.

A visible indication of the position of the floating reaction member is obtained by constructing the portion of the housing adjacent the magnetic switches from transparent material or fabricating transparent windows in this area through which operation of the system can be visually monitored, if desired.

Another feature of the invention involves the utilization of a system of one-way check valves in the coalescer screen assembly of the separator for ensuring efficient flow of water through the coalescer screens both in a forward and backflush mode.

Finally, the present invention contemplates the provision of a particular form of flexible seal means beneath the floating unit of the separator in combination with a pressure balancing conduit to eliminate the possibility of oil gathering above the floating member.

The above general summary of the invention is intended to be introductory with respect to a detailed description of a specific, illustrative embodiment of the invention that is set forth below. Of course, the scope of the invention is intended to be limited solely by the claims set forth below, with the detailed description describing a preferred embodiment of the invention in accordance with statutory requirements.

DETAILED DESCRIPTION OF THE INVENTION

With reference to the attached drawings:

FIG. 3 is a view similar to FIG. 2, only shows the counterbalance mechanism used with a floating diaphragm element and a pressure equalizing conduit; and FIG. 4 shows the counterbalance used with a sealed floating dome element and a pressure equalizing conduit.

Figure 1:
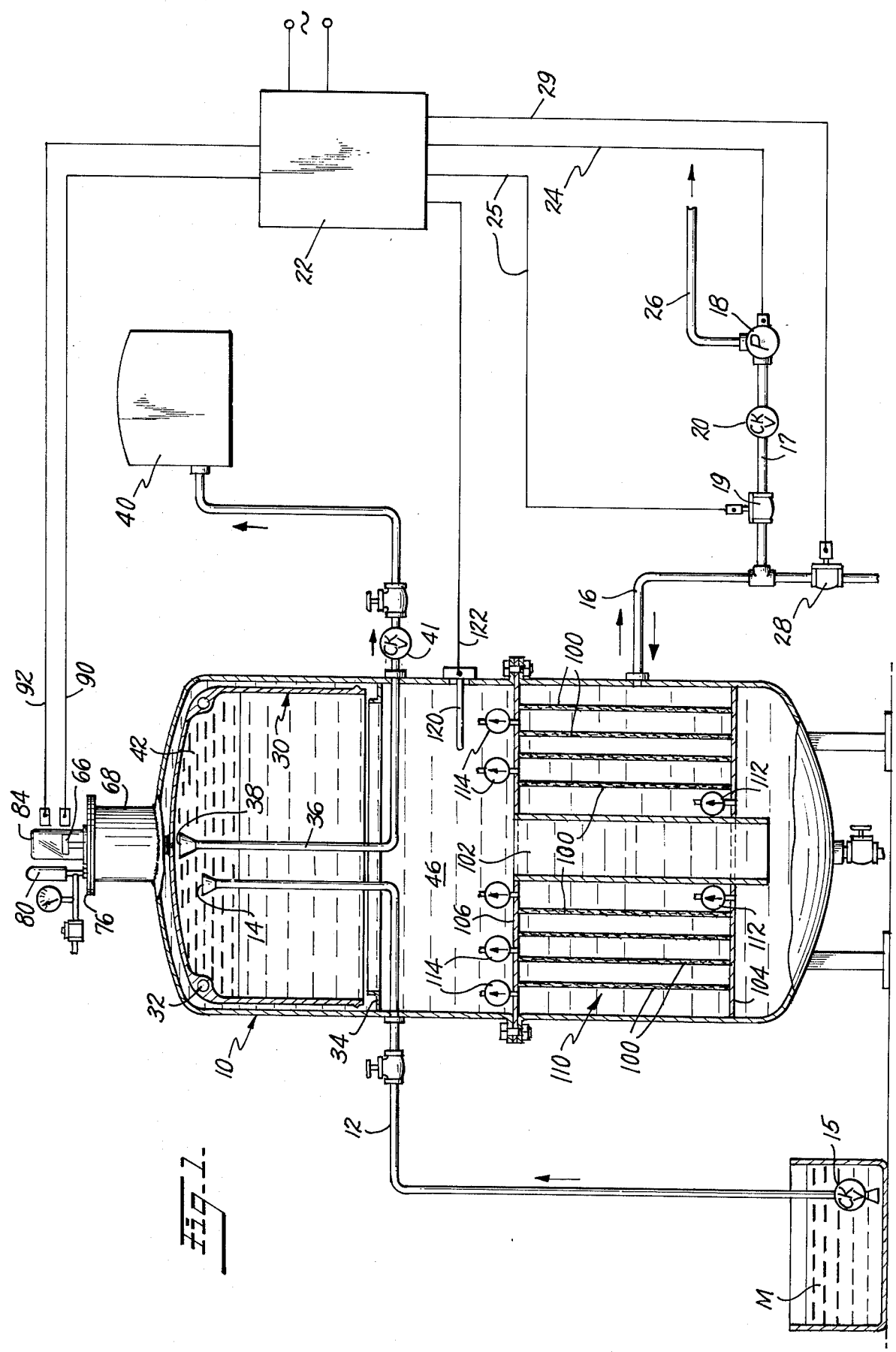
FIG. 1 is a schematic view of a floating dome separator system incorporating the dome balancing and position sensing system of the present invention, and the coalescer screen improvement.

With reference to FIG. 1 of the drawings, a separator system for separating oil from oily water includes a separator tank 10 having an oily water mixture inlet conduit 12 that continues internally of the separator tank 10 up to an upwardly extending extremity 14 which constitutes the actual inlet for oily water mixture within the tank 10. Inlet conduit 12 includes a one-way check valve 15 at the source M of oily water mixture to be processed. A water line 16 located towards the lower end of the tank 10 serves as both a clean water discharge line and a backflush/tank pressurizing inlet line, as will be more fully explained below. Line 16 is connected to suction pump 18, through line 17, solenoid valve 19 and one-way check valve 20, the pump 18 being connected to a control panel 22 which provides a power supply for the pump and controls its operation through lead 24. The solenoid valve 19 is connected to the control panel through lead 25. Line 26 is the outlet line for clean water processed by the separator system. Conduit 16 is also connected to a clean water supply under pressure through solenoid valve 28 which is connected to control panel 22 through lead 29.

Normally, the tank or housing 10 is initially filled with water or contains oil and water undergoing separation, the valve 19 is normally opened and valve 28 is normally closed. Actuation of pump 18 then draws a suction on line 16 which, since the tank 10 is hermetically sealed, causes discharge of water through line 16 from tank 10 and intake of oily water mixture line 12 into the tank. Since the mixture from source M is not agitated, emulsified or homogenized by a pump located between the source M and the separator tank 10, but rather is quietly released at the top of the upstanding column of conduit 12 in separator 10, separation by gravity of oil and water proceeds rather rapidly within the tank 10.

A dome element 30 loosely fits within tank 10 and may be provided with flotation chambers 32. The dome 30 will be counterbalanced to have slightly negative buoyancy in water (fresh or salt water, as the situation demands) so that with no oil whatsoever in the separator the dome rests on lower stop means 34.

Oil discharge conduit 36 extends to a position at the extremity 38 thereof within the tank 10 just beneath the inner surface of the top of the dome 30 when the dome is in its lower extreme rest position on the stop 34. The other end of conduit 36 empties into an oil storage tank 40 through one-way check valve 41. Inlet line 12 discharges at 14 in an area beneath the dome 30.

Thus, it will be evident that upon operation of pump 18 in the normal manner, oily water mixture is sucked into the tank 10 and discharged gently beneath the dome 30, with the water dropping down to the lower part of the tank and the oil rising to the upper internal area beneath the dome 30. The dome 30 will then be influenced by the buoyancy of oil trapped beneath the dome 30, which buoyancy will be a function of the relative densities of the oil accumulated beneath the dome. The reaction of the dome to the buoyancy force of the accumulated oil will be a tendency to float upwardly to the extent that the buoyancy force is unbalanced. If the dome 30 were floating with initial neutral buoyancy, for example, the presence of any appreciable amount of oil under the dome 30 would cause it to gradually rise to an upper limit in the tank 10. It will be readily understandable that this is not desired, since the objective of the separator system is to cyclically accumulate a certain volume of oil beneath the dome, and to discharge substantially all of this oil into a collection tank with a minimum of interruption to the overall separatory process. A balancing system for the dome is therefore desirable to enable the accumulation of a predetermined volume of oil beneath the dome and means for sensing the occurrence of such predetermined accumulation in a precise manner. Once the accumulation of a desired volume of oil has occurred, control means for the separator must sense the occurence of this accumulation and institute control of the system to momentarily cease the inflow of oil and water mixture, pressurize the interior of the tank with water to cause the oil to be discharged from the separator and finally to return the system to its original operating mode when sufficient oil has been removed from the system.

The dome balances system provided by this invention will be described momentarily, but another characteristic of the separator should first be understood. Upon shutting off of pump 18, and with the closure of valve 19 and opening of valve 28, water under pressure is admitted quickly into the tank 10. The check valve 15 prevents outflow through conduit 12, with the consequent result that oil is discharged through conduit 36, the only other outlet from the separator tank. The inlet of conduit 36 is located beneath the dome 30 but closely adjacent the upper surface of the dome when it is in its lowermost position. Oil will therefore be discharged through conduit 36 as the interior of tank 10 is pressurized with fresh water and the dome will gradually sink as the oil is discharged from the separator, since the volume of oil causing the upward buoyant force on the dome is gradually diminished. If the inflow of fresh water through line 16 is continued indefinitely, of course the oil would all be removed, the dome 30 would settle onto its stop, and water eventually would be discharged through oil discharge conduit 36. Obviously, this condition is never intentionally allowed to occur, as will become evident in the ensuing description.

In the drawings, for visualizing the various fluid levels within tank 10 during operation, oil is indicated as 42, and water as 46.

Figure 2:
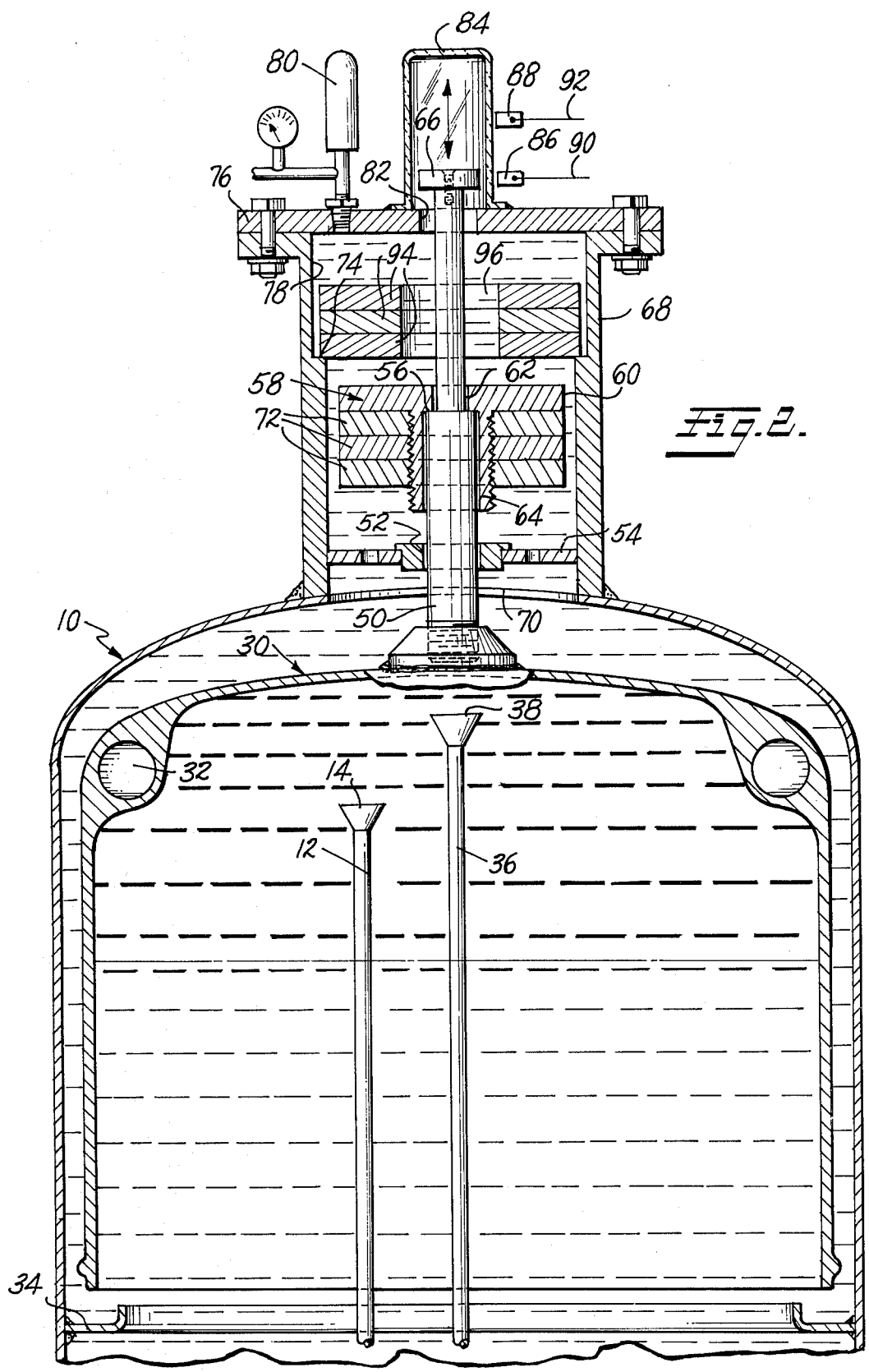
FIG. 2 shows the details of the counterbalance and position sensing system with a floating dome element.

With reference to FIGS. 1 and 2, the improved dome balancing means includes an upwardly extending shaft or rod element 50 connected directly to the upper end of dome 30. Obviously, the connection between the rod 50 and the dome is made at the upper central area of the dome for the sake of simplicity and convenience. Rod 50 could be connected to any part of the dome 30 so long as it moves directly in proportion to the movement of the dome itself, or is capable of transmitting such proportional movement.

Rod 50 extends through a guide opening 52 in apertured plate 54 and is provided with a shoulder at 56 upon which may rest a first weight securing means 58 in the form of a base plate 60 having an opening 62 thereon and having an internally threaded tube 64 welded thereto so that it extends coaxially with the opening 62. The weight securing means 58 itself may constitute one of the weight elements. The central opening 62 in plate 60 is dimensioned smaller than the larger dimension of rod 50 so that plate 60 will always rest on the shoulder 56 of rod 50. The upper, smaller portion of rod 50, of course, enables the removal and placement of plate 60 on the shaft 50 from above. The upper extremity of rod 50 is provided with a permanent magnet element 66 removably secured to the rod 50.

Threadably received on tube 62, through which the larger dimension of shaft 50 extends freely, are weight masses in the form of plates 72, the plates 72 being readily secured to or removed from the tube 62, and being of variable size and mass to enable precise adjustment of the total weight of the first weight means 58 on shaft 50. It will be readily appreciated that the total initial weight of the dome and its attachments as illustrated in FIGS. 1 and 2 will be equivalent of the weight of the dome itself, the shaft 50, the first weights 58 and the magnet 66, along with the weight of structure connecting these elements. The buoyancy of the dome 30 therefor, and the structure directly connected thereto, will depend upon the weight of the water displaced by the assembly as compared to the weight of the assembly itself. The first weight means 58 actually adjusts the buoyancy of the dome 30 so that it can be made precisely negatively buoyant to the desired degree.

Surrounding rod 50 and extending above the tank 10 is a housing 68 for the dome balancing system, the housing 68 being secured such as by welding to the tank 10. The tank 10 is provided with an upper opening 70 located below the housing 68. A horizontal support shoulder surface 74 is provided within housing 68 and an upper cover 76 is releasably secured to the top opening 78 of the housing 68. An air eliminator valve 80 of conventional design is provided in the cover 76. Cover 76 furthermore is provided with a central opening 82 through which the upper extremity of rod 50 freely extends during normal operation of the separator. A transparent cover 83 is secured to the cover 76 over the opening 82, the cover 84 preferably being made of strong plastic material.

Externally of the cover 84 magnet sensitive relay switches 86 and 88 are placed in position where they may be tripped by the proximity of magnet 66 within the cover 84 as the rod 50 moves up and down with the movement of the dome 30. Such magnetic sensitive switches are conventional per se, the particular advantage of their use here is that the tank 10, housing 68 and cover 84 can be hermetically sealed, yet the floating position of the dome 30 can be remotely sensed externally of the separator tank. The transparent nature of the cover 84 also enables one to make a visual check of the operation of the system. Special seals, shafts and bearings are therefore eliminated by using the present invention.

Switches 86 and 88 respectively sense low and high dome positions, and are connected to control panel 22 via leads 90 and 92.

A second set of weight masses are provided wihin housing 68 in the form of stacked plates 94 resting on the shoulder surface of ledge 74. The plates 94 have an enlarged, central opening 96 through which a portion of rod 50 freely extends. Significantly, however, the opening 96 will not accommodate the plate element 58, whereby, upon upward movement of rod 50 to the point that the upper side of plate 58 contacts the underside of the lowermost plate 94, continued upward movement of rod 50 will raise the second weights 94 along with the base plate 60 and weights 72.

Thus, the buoyancy of dome 30 will be adjustably balanced in two phases by the present system in an entirely passive manner. The upward flotation of dome 30 initially will be resisted by the gravitational pull on the first set of weights 72. Flotation of the dome further upwardly beyond the point where plate 58 contacts the second set of weight means 94 will be resisted by the gravitational pull on the combined masses of weights 72 and 94. By varying the masses of the weight elements, the balance forces on dome 30 can be precisely regulated to ensure that a predetermined volume or weight of oil 42 trapped under the dome will be accumulated before the dome can reach an upper flotation position. Moreover, the high limit switch 88 can be precisely positioned to sense accurately when the buoyancy of the dome and the accumulated oil beneath the dome exceeds the balancing force of the combined weights 72 and 94.

In operation, the tank 10 in initially filled with water approximately to the level of the tank cover 76, preferably by closing valve 19 and opening valve 28 to cause fresh (or salt) water to be admitted into the tank through line 16. Check valve 15 prevents outflow through inlet line 12 beyond the valve 15, but line 12 can also be closed by an appropriate shut off valve. Line 36 is likewise closed during the filling operation. The tank 10 is hermetically sealed, with air being exhausted out the air eliminator 80. Suitable switches at the control panel are then thrown to cause the system to operate in the automatic mode. Valve 28 is closed, valve 19 is open and lines 12 and 36 are in communication respectively with an oil and water mixture M and a storage tank 40. Suitable weights 72 have been placed on rod 50 to cause the dome to rest at its lower limit. Operation of pump 18 can be regulated in any suitable manner, such as, for example, where mixture M is located in a bilge of a vessel, by a switch means response to the bilge water level, and when functioning creates a negative suction pressure in tank 10. As water is withdrawn through line 16 and discharged through line 26, oil and water mixture is drawn into the separator through line 12. In the separator, oil will float towards the underside of the dome 30, while water will gradually drop to the lower area of the tank. The volume of water displaced from beneath dome 30 will create an upward flotation force on dome 30 which force will be a function of the relative densities of the oil and water, and the mass of the volume of oil accumulated between the dome. Stated in a different manner, the force is a function of the relative densities of the oil and water and the mass of the volume of water displaced by the oil beneath the dome. Initially, upward flotation of the dome will be resisted by the downward force of weights 72 on shaft 50, and low dome position switch 86 will sense this condition and transmit an appropriate signal to control panel 22. As the mass of oil beneath the dome increases, the buoyancy forces acting on the dome increase and the weights 72 will be raised along with the dome until the second set of weights are engaged. Continued accumulation of oil then causes the total weight system to be lifted by the dome, but this condition will virtually instantly be sensed by the high position switch 88 which will transmit a signal appropriate for this condition to control panel 22.

The high dome position, of course, is indicative of the accumulation of a predetermined volume or weight of oil beneath the dome that must be discharged from the separator periodically. Control panel 22 includes appropriate circuitry to utilize the signal transmitted by the high dome position switch 88 and to send an appropriate signal to cease operation of pump 18, close valve 19 and open valve 28. This causes further mixture input to the separator to cease, and forces fresh water under pressure into the tank 10 to cause oil to be discharged from line 36 to storage tank 40, as described above.

Outflow of oil from beneath the dome will cause it to sink towards its starting position until the low dome position switches sense a low position of the dome and control panel 22 responds to this condition. It will be apparent that once the second set of weights 94 rest on the shoulder 74 of housing 68, the downward balancing force exerted on dome 30 will be reduced. However, oil discharge is programmed to continue until a low dome position is sensed by the low dome position switch 86. Circuitry within the panel will then return the system to its original mode of operation whereby valve 19 is opened, valve 28 is closed and operation of pump 18 is enabled. Continued operation of pump 18 will cause continued recycling of the system so long as sufficient oil accumulates beneath the dome to cause it to reach its upper flotation limit. For a suitable example of a control panel and pump control system applicable to the present invention, reference is made to the above-cited copending application of Walters et al., Ser. No. 530,539.

Coalscer screens 100 (loosely referred to as filters) are provided at the lower end of tank 10, the screens being concentrically nested about a central conduit 102 which extends downwardly through the screen assembly and slightly beyond the bottom of a lower screen support plate 104. Upper screen support plate 106 along with lower plate 104 extends transversely across the tank internal dimension, and, along with the conduit 102, effectively seals the tank 10 from a filter chamber 110 which contains the screens 100 and which communicates with water outlet 16.

Flow of water into chamber 110 is through lightly loaded one-way check valve 112 which allow water to be admitted to the chamber 110 from below the lower plate 104. Inflow of water to chamber 110 occurs between the duct 102 and the innermost coalescer screen 100 when pump 18 is operating. The water then passes radially outwardly through the successive screens 100 and finally out through line 16. Oil droplets that may be entrapped in the sinking water beneath the dome and not separated out in the main mass of oil 42 are caught up on the coalescer screens, which are preferably formed of an oleophobic porous, fibrous material, woven or knitted, rough on one side and smooth on the other side, the screens being supported on a vertical metal or plastic framework. As illustrated, the screens preferably are concentric and cylindrical in form.

The screens 100 are backwashed during the oil discharge operation when the tank 10 is pressurized by incoming water through line 16. One-way check valves 114 provided in the top plate 106 provide the only outlets for chamber 110, whereby, inflow of water to chamber 110 through line 16 will reverse flush the screens 100 and discharge water and backflushed oil particles from the chamber areas between the screens 100 into the tank 10 above plate 106. An oil detector 120 connected to panel 22 via lead 122 is provided within tank 10 above the screens 100 to detect excessive oil at this level of the separator. Actually, detector 120 can be located at any desired position beneath the dome 30 and above the screen support plate 106. If oil in an emulsion state with water reaches the coalescers 100, oil could be passed through the screens and into the water discharge line. Also, excessive oil at this level of the tank 10 would be indicative of a malfunction in the separator control system. If this situation is sensed at the detector probe 120, appropriate circuitry at control panel 22 will shut down the separator system and sound an appropriate alarm.

Referring to FIG. 3, the dome balancing system shown in FIGS. 1 and 2 is illustrated with a floating diaphragm member 200 in tank 100. A flexible imperforate seal element 202 enables free-floating action of the diaphragm member 200 in water within tank 10, while flotation chambers 204 provide buoyancy for the member 200. A pressure equalizing pipe 206 provides communication between the areas 207 above member 200 and the lower part of tank 10 adjacent or below the filter chamber 208, which, in this embodiment, includes an outer peripheral wall 210 which provides a chamber 212 which communicates freely with the water at the lower area of the tank 10 outside the filter chamber 110.

In this embodiment of the invention, an upper guide element 214 for rod 50 is provided in addition to the lower guide 52 to stabilize the rod motion.

It will be readily observed that the principle of operation of this embodiment is similar to that of the dome unit, only the oil in this configuration is accumulated beneath the floating diaphragm assembly 200 and 202.

In FIG. 4, a floating dome element 300 is provided at the top end of a larger tank 10, and bellows or the like seal 302 is provided beneath the dome to prevent leakage of oil around the bottom of the dome 300. A pressure equalizing conduit 304 provides communication between the water chamber 306 above dome 300 and the lower portion of tank 10 below the lower filter plate 104. The seal 302 in this instance is formed in such a manner that free movement of dome 300 is unimpeded in a vertical sense and the seal element itself does not react to the buoyant force of oil in the upper area of the tank 10 in a vertical sense. This can be accomplished, for example, by using a bellows element extending substantially vertically between the lower periphery of dome 300 and the periphery of opening 310 in the upper part of tank 10. The horizontal cross-sectional area between the dome 300 then will be constant all the way down to the top of the tank, and the buoyancy forces due to accumulated oil beneath the dome will not be reacted vertically by the seal 302. A second flexible seal 308 may be provided at the bottom of conduit 304 to further prevent oil contamination in the chamber 306 above the dome 300.

The above description is intended to be exemplary of preferred embodiments of the present invention, modifications of these embodiments and different arrangements of specific structure falling within the scope of the appended claims are intended to be encompassed by this patent.

We claim:

1. In a system for detecting the accumulation of a predetermined quantity of less dense fluid within a gravitational separator for immiscible liquids of different densities, including a tank containing a reaction member normally disposed beneath a layer of higher density liquid undergoing separation when the separator is operating and wherein said reaction member is initially counterbalanced to be barely negatively buoyant in the liquid of higher density, said reaction member being normally subjected to the upward floating force of accumulated less dense liquid floating in the more dense liquid during separator operation, the improvement comprising: a housing in communication and assembled with the tank; a first mass of predetermined weight located within the tank and housing assembly, and connected to said reaction member, said first mass contributing at least in part to the negative buoyancy of said reaction member; a second mass of predetermined weight also located within the tank and housing assembly and normally supported from beneath by the separator structure; means for enabling said reaction member to raise said second mass along with said first mass only upon the accumulation of a predetermined quantity of less dense liquid in the tank, such accumulation creating a predetermined upward flotation force on the reaction member; and remote sensing means outside the tank and housing assembly physically unconnected to the second mass for detecting when the reaction member has raised the second mass.

2. The system recited in claim 1, wherein said tank and housing assembly is hermetically sealed except for inlet and outlet conduits, and further including a magnetic element within the tank and housing assembly movable by said reaction member; a magnetic sensitive detector outside the tank and housing assembly responsive to movement of said magnetic element when said second mass is raised by said reaction member; and means responsive to the operation of said detector for providing a signal indicative of when said second mass is raised.

3. The system recited in claim 1, wherein the weights of said first and second weight masses are variable, and both weight masses are disposed within the housing.

4. The system as recited in claim 2, further including a second detector means located outside the tank and housing assembly for detecting the position of said magnetic element when said reaction member is at a lower position where the upward flotation force acting on the reaction member is insufficient to raise the second mass.

5. The system recited in claim 1, including a suction pump means for drawing the mixture of liquids to be separated into the separator tank and for drawing heavier liquid from the tank; a power supply for the pump means; means connected to said first and second detector means for transmitting respectively high and low reaction member position signals in response to the high and low positions, respectively, of said magnetic element; and means for enabling and disabling said power supply to said pump in response to said signals whereby the pump operation is disabled when the high position signal is transmitted and enabled when the low position signal is transmitted.

6. The system recited in claim 1, wherein said first mass is connected to said reaction member by a vertical rod secured at its lower end to said reaction member and movable vertically therewith, said rod having means thereon for engaging said first mass to cause the latter to move vertically with said rod, and further wherein said means for enabling said reaction member to raise said second mass comprises means connected to said rod and directly engageable with said second mass when said rod is raised by said reaction member upon the accumulation of a predetermined quantity of less dense liquid within the tank.

7. The system recited in claim 6, wherein said means connected to said rod and directly engageable with said second mass includes a first weight mass support assembly including an upper surface, and further wherein said upper surface engages the second weight mass from below when the first weight mass support assembly is raised beyond a predetermined elevation.

8. The system recited in claim 7, wherein said first weight mass support assembly comprises a plate having a central aperture and said rod includes a shoulder portion thereon upon which the periphery of said central aperture of said plate rests, with an upper portion of the rod extending upwardly through said aperture, said first weight mass support assembly including means for removably securing first weight mass elements to said assembly, and further wherein the second weight mass comprises at least one plate element having an aperture through which said upper rod portion also extends; and still further wherein a magnetic element is disposed adjacent the distal end of said rod above the second weight mass and is movable in response to vertical rod movement.

9. The system recited in claim 1, further wherein said reaction member includes a periphery, and further including a flexible, vertically compliant seal means extending vertically from the periphery of the reaction member, the seal means being connected to the periphery of the reaction member at one end and to the separator tank and housing assembly at its other end, said reaction member and seal dividing the separator tank and housing assembly into two chambers, one chamber being below the reaction member and the other above the reaction member; means for admitting more dense fluid above the reaction member; a pressure equalizing conduit extending between the chamber above the reaction member and a lower area of the separator tank below the reaction member; means for filling said conduit with more dense liquid; whereby said conduit, when filled with more dense liquid, provides a pressure equalizing column between the chamber above the reaction member and said lower area of the separator tank.

10. The system recited in claim 9, further including a lower flexible seal means at the bottom of said conduit arranged to isolate the interior of said conduit from the lower interior area of the tank while still enabling pressure differentials to be equalized on either side of the lower seal means through movement of the latter.

11. A method for detecting the accumulation of a predetermined quantity of less dense liquid within a gravitational separator tank and attached housing assembly for separating mixture of immiscible fluids of different densities, the tank and housing assembly being hermetically sealed except for inlet and outlet conduits, the tank otherwise being filled with liquid of higher density to be separated and including therein a reaction member subjected to upward flotation force of less dense liquid accumulated in the housing and tending to float upwardly in the more dense liquid, comprising:

a. filling the tank with more dense liquid sufficient to immerse the reaction member therein;

b. counterbalancing said reaction member with a predetermined first weight mass so that the reaction member is barely negatively buoyant in the more dense liquid;

c. admitting a quantity of immiscible liquids of different densities into the upper portion of the tank beneath the reaction member and subjecting the reaction member to the flotation force of liquid of lesser density floating in liquid of higher density while drawing out liquid of higher density from the lower portion of the tank, whereby the reaction member is subjected to an increasing flotation force of less dense liquid than gravitationally separates from the more dense liquid and accumulates beneath the reaction member;

d. supporting in a vertical sense a second predetermined weight mass within and by the tank and housing assembly and causing the second mass to be raised by the reaction member when the flotation force of accumulated less dense liquid is sufficient to overcome the gravitational load of the combined first and second weight masses;

e. remotely detecting by sensing means located outside the tank and housing assembly and physically unconnected to the second weight mass the occurence of the upward movement of the reaction member within the housing when both the combined first and second weight masses are raised by the reaction member.

* * * * *